Dec. 8, 1936.  B. NOLTE  2,063,333
POWER DRIVEN TURF FORKING APPARATUS
Filed July 20, 1935  2 Sheets-Sheet 1
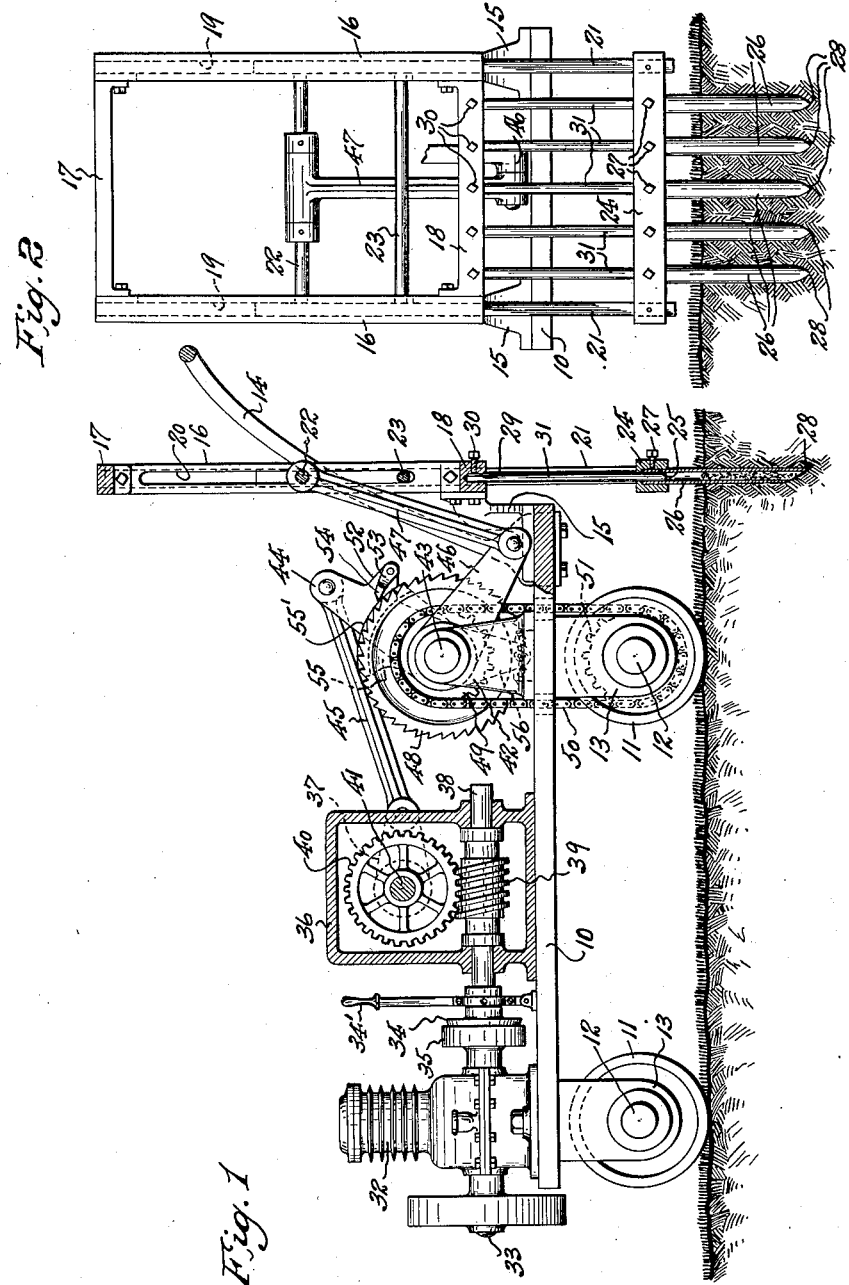
INVENTOR
Bernhard Nolte,
BY
George D. Richards
ATTORNEY Dec. 8, 1936. B. NOLTE 2,063,333
POWER DRIVEN TURF FORKING APPARATUS
Filed July 20, 1935 2 Sheets-Sheet 2
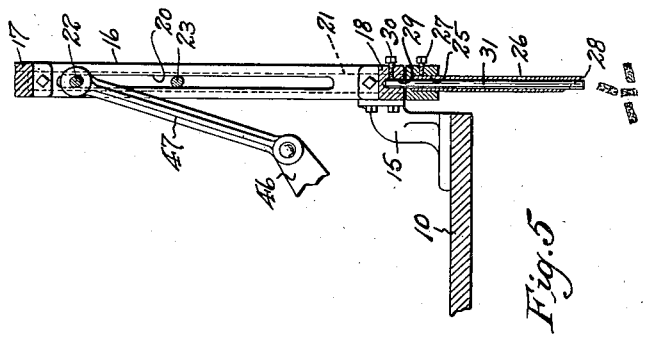
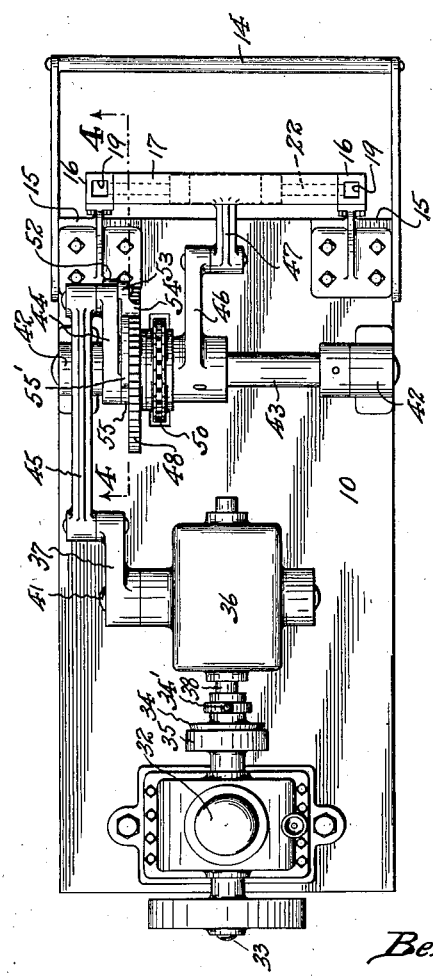
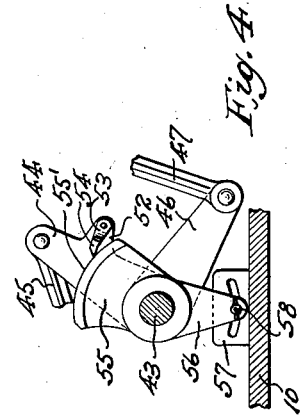
INVENTOR
Bernhard Nolte,
BY
George D. Richards
ATTORNEY Patented Dec. 8, 1936

2,063,333

UNITED STATES PATENT OFFICE 2,063,333

POWER DRIVEN TURF FORKING APPARATUS

Bernhard Nolte, Westfield, N. J.

Application July 20, 1935, Serial No. 32,345

9 Claims. (Cl. 97—36)

This invention relates to improvements in turf forking apparatus; and the invention has reference, more particularly, to a novel power driven turf forking machine.

This invention has for an object to provide a novel construction of power driven turf forking apparatus having a novel tubular tine turf fork means, adapted to be automatically reciprocated so as to cut and remove plugs out of turf under treatment, thereby to form in the turf bearing soil clean cut openings for the reception of water, air, and fertilizers or other soil dressings or enriching agents. With this object in view, the invention provides a novel power driven apparatus for treating turf, and especially for improving the growth and development of turf in lawns, golf-putting greens, turf tennis courts, polo fields, and the like. By the use of the novel automatic or self-actuated forking apparatus of this invention, a maximum area of turf may be treated with a minimum expenditure of labor and time, and the turf area so treated is rapidly provided with a multiplicity of clean cut holes, downwardly penetrating the same from the surface, whereby access to the grass roots is opened for the entrance thereto of air, water, fertilizer and soil treating agents. By this treatment not only may the grass roots be properly fed to induce rapid and healthy growth, but such roots are also given room in which to expand and to reach deeply down into the soil. Furthermore, stiff and hard soil is exposed to erosion, whereby the same may more easily crumble and merge with loose top dressing, while at the same time drainage conditions of the turf are also greatly improved.

This invention has for a further object to provide in combination with power driven forking means, an intermittently actuated locomotive means, whereby the apparatus is automatically shifted step by step over the turf area to be treated, so that a properly spaced and distributed disposition of the soil perforating effects of the forking apparatus is assured.

Other objects of this invention, not at this time more particularly enumerated, will be understood from the following detailed description of the same.

An illustrative embodiment of this invention is shown in the accompanying drawings, in which:—

Fig. 1 is in part a side elevation and in part a sectional view of the novel power driven turf forking apparatus according to this invention; Fig. 2 is a fragmentary end elevation, showing the forking means of the apparatus; Fig. 3 is a plan view of the apparatus; Fig. 4 is a fragmentary sectional view, taken on line 4—4 in Fig. 3; and Fig. 5 is a fragmentary vertical sectional view, showing the up-lifted or withdrawn position of the forking means of the apparatus.

Similar characters of reference are employed in the hereinabove described views, to indicate corresponding parts.

In said drawings, the reference character 10 indicates the platform of a suitable carriage, the traction wheels 11 of which have axles 12 suitably journaled in bearing elements 13 which project from the underside of said platform.

The forking means of the apparatus is supported from the platform 10, preferably in a position so as to overhang the rearward end of the same; and also suitably affixed to said rearward end of the platform is a handle frame 14 by means of which the operator may guide and direct the movements of the carriage.

The forking means comprises a preferably perpendicular guide frame, which is attached to the platform 10 by means of off-setting supporting brackets 15. This frame may be variously designed, but illustrative of one practical form thereof, the same comprises a pair of laterally spaced upright tubular guide members 16, connected together at their upper ends by a top cross-bar 17, and at their lower ends by a bottom cross-bar 18, which respectively extend therebetween. Each guide member 16 is provided throughout its length with an internal guideway or slideway passage 19, and formed in the opposed inwardly facing walls of said guide members 16, intermediate the top and bottom cross-bars 17 and 18, are longitudinal slots 20. Slidably movable in the slideway passages 19 of the guide members 16, are vertically reciprocable slide-bars 21, the upper end portions of which are connected together by an upper cross-head 22 adapted to ride in the slots 20. A bracing or reenforcing cross-head 23 may also be provided between said slide-bars 21, below and in spaced relation to said upper cross-head 22, said cross-head 23 being likewise adapted to ride in said slots 20. Secured to and between the downwardly projecting free end portions of said slide-bars 21 is a transverse base-bar 24. The thus associated slide-bars, cross-heads and base-bar form a reciprocable fork frame vertically movable in connection with said guide frame. This base-bar 24 is provided with a plurality of laterally spaced apart downwardly open sockets 25 to receive the butt ends of a plurality of tubular fork tines 26, which are suitably affixed to the base-bar, as by set-screws 27, so as to freely depend therefrom. The lower free ends of said fork tines are obliquely cut so as to provide such ends with soil penetrating pointed portions 28. Preferably, at least the lower pointed portions 28 of the tines are case-hardened or may be formed of stellite steel to render the same more efficient and wear resisting. The bottom cross-bar 18 of the guide frame is provided with a plurality of downwardly open sockets 29, spaced to correspond in number and position to the number and position of the fork tines 26. Affixed by their butt ends in said sockets 29, as by set-screws 30, are a plurality of fixed ejector rods 31 which extend downwardly so as to enter through the base-bar 24 respectively into the interiors of the fork tines 26, whereby the latter, when reciprocated, will slide up and down over said ejector rods 31.

Means for supplying and transmitting actuating power to operatively reciprocate the forking means are provided. Such means may also be variously designed, constructed and arranged. Illustrative of one arrangement thereof, the same comprises a prime mover, preferably in the form of an internal combustion motor 32, which is mounted upon the forward end of the carriage platform 10 so as to be carried thereby. The crank-shaft 33 of said motor may be operatively connected and disconnected at will to a power transmission mechanism through the medium of a manipulatable clutch means, the movable element 34 of which is actuated by a hand-lever 34' to engage or disengage the fixed element 35 which is driven by the motor crank-shaft. A reduction gearing contained in a housing or gear box 36 which is affixed upon the carriage platform 10, operates a rotatable crank member 37. The reduction gearing as shown, comprises a worm drive shaft 38 journaled longitudinally through said housing or gear box 36 in alignment with the motor crank-shaft 33; said worm drive shaft having the movable element 34 of the clutch means mounted thereon. Fixed on said worm drive shaft 38 is a worm 39 which meshes with and drives a worm gear 40 fixed on a transverse shaft 41 also journaled in and extending through said housing or gear box 36. The crank member 37 is fixed on an exteriorly projecting end of said transverse shaft 41, so as to be driven by the latter. Mounted on said carriage platform 10, between the forking means and said reduction gearing and crank member, are transversely aligned bearing members 42 in and between which is mounted a rock-shaft 43. Fixed on said rock-shaft 43 is a lever arm 44, which is interconnected with the crank member 37 by a link 45. Also fixed on said rock-shaft 43 is another lever arm 46 to which is pivotally connected one end of a connecting rod 47, the other end of which is pivotally connected to the upper cross-head 22 of the reciprocable fork frame. The lever arms 44 and 46 together provide an oscillatable bell-crank means for translating the revolving movement of said crank member 37 to a reciprocating movement of said fork frame and the fork tines carried by the latter, whereby the fork tines are moved downward to penetrate the turf bearing soil and then upwardly and outwardly withdrawn from the latter to remove soil plugs cut thereby.

In a simple form of the apparatus, as thus far described, the operator may hold the carriage stationary during a descending operative movement of the fork tines and as said tines are withdrawn and while clear of the soil, may push the carriage ahead preparatory to a succeeding descent of the fork tines, thus advancing the carriage from time to time to distribute the effects of the forking operation over a strip of turf area under treatment. In order to assure equal spacing apart of the rows of fork tine perforations formed in the soil, as well as to relieve the operator of the necessity of advancing the carriage by hand, means may be provided for intermittently moving or advancing the carriage by power, step by step, for the production of equi-spaced rows of forked soil perforations. One illustrative form of such carriage locomotion means is shown in the drawings, and comprises a ratchet wheel 48 mounted on said rock-shaft 43 so as to freely rotate thereon. Fixed on the hub of said ratchet wheel 48, so as to turn therewith, is a drive sprocket wheel 49 over which runs a drive chain 50. Said drive chain 50 drives a driven sprocket 51 which is fixed on the axle 12 of the rearward pair of traction wheels 11, whereby forward rotary motion may be imparted to said axle and wheels at proper times. Pivotally carried on a supporting projection or lateral extension 52 of said lever arm 44 is a pawl 53, the nosing 54 of which cooperates with the teeth of said ratchet wheel 48. Disposed intermediate said lever arm 44 and said ratchet wheel 48 is a pawl release cam 55 having an operative arcuate surface 55' adjoining the tops of the teeth of said ratchet wheel 48 along a portion of the circumference of the latter, whereby the pawl is lifted and maintained out of operative engagement with the ratchet wheel teeth during certain portions of the oscillatory back and forth movement of the pawl as effected by operative oscillation of the lever arm 44. Said pawl release cam 55 is adjustable relative to the amplitude of oscillation of the lever arm 44 and the pawl 53 carried thereby. This adjustable relation is attained by mounting the pawl release cam 55 for movement about the axis of the rock-shaft 43; the cam being arranged to be fixed in desired adjusted position by means of a depending tail-piece 56 and stationary slotted anchor plate 57, a lock nut 58 being provided to secure the former in adjusted fixed relation to the latter (see Fig. 4). In operation, as the lever arm 44 swings rearward, to impart a downward operative movement to the forking means, the pawl 53 is carried onto the release cam 55 and thus lifted out of engagement with the ratchet wheel 48; the pawl thereupon riding rearwardly on the release cam while the fork tines enter the soil. As the lever arm 44 reverses its movement to retract the fork tines from the soil, the pawl rides forward on the release cam until the fork tines are freed from the soil, whereupon continued movement of the lever arm 44 and pawl, causes the latter to ride off of the release cam and operatively engage the ratchet wheel 48 thus imparting a forward movement thereto while the forking means continues and completes its retractive upward movement. This forward movement of the ratchet wheel is transmitted through the sprocket and chain drive to the rear traction wheels of the carriage, so that the carriage is moved ahead a predetermined distance preparatory to a succeeding operative descending stroke of the forking means. It will thus be evident that each operative reciprocation of the forking means is alternated with a progressive forward movement of the carriage, so that successive rows or fork tine perforations are automatically produced by the power operation of the apparatus.

As the fork tines are withdrawn from the soil, after penetration of the latter, the soil plugs, which are cut and carried into the tubular interiors of said tines, will be lifted out of the soil by the rising movement of the tines. As the tines continue upward movement, the same telescope over the ejector rods 31, which, in effect, descend through the tine interiors and thereby eject the soil plugs carried by the tines (see Fig. 5), thus freeing the tines for a succeeding soil penetrating and cutting operation.

From the above description it will be obvious that this invention provides a very efficient and easily controlled power actuated apparatus for the intended purposes, whereby, in use, a large area of turf may be rapidly treated with a minimum of labor.

I am aware that many changes may be made in the above described constructions and that many widely different embodiments of this invention could be made without departing from the scope thereof; it is therefore intended that all matter contained in the above description and shown in the accompanying drawings shall be interpreted as illustrative and not in a limiting sense.

I claim:—

1. In an apparatus of the kind described, a movable carriage, an upright guide frame supported by said carriage, a forking means reciprocable in said guide frame, said forking means having downwardly directed tubular fork tines, a power producing means on said carriage, transmission means actuated by the latter for operating said forking means, and said transmission means including locomotion means for intermittently moving said carriage in timed relation to the operation of said forking means.

2. In an apparatus of the kind described, a wheeled carriage, an upright guide frame supported by said carriage so as to overhang an end thereof, a forking means reciprocable in said guide frame, said forking means having downwardly directed tubular fork tines at its lower free end, stationary ejector rods carried by said guide frame with which said tines are in telescopic slidable relation, and means on said carriage for actuating said forking means.

3. In an apparatus of the kind described, a wheeled carriage, an upright guide frame supported by said carriage so as to overhang an end thereof, a forking means reciprocable in said guide frame, said forking means having downwardly directed tubular fork tines at its lower free end, stationary ejector rods carried by said guide frame with which said tines are in telescopic slidable relation, a power producing means on said carriage, and transmission means actuated by the latter for operating said forking means.

4. In an apparatus of the kind described, a wheeled carriage, an upright guide frame supported by said carriage so as to overhang an end thereof, a forking means reciprocable in said guide frame, said forking means having downwardly directed tubular fork tines at its lower free end, stationary ejector rods carried by said guide frame with which said tines are in telescopic slidable relation, a power producing means on said carriage, transmission means actuated by the latter for operating said forking means, and said transmission means including locomotion means for intermittently moving said carriage in timed relation to the operation of said forking means.

5. In an apparatus of the kind described, a wheeled carriage, an upright guide frame supported by said carriage, a forking means reciprocable in said guide frame, said forking means having downwardly directed tubular fork tines at its lower free end, a power generator on said carriage, an oscillatable bell-crank means mounted on said carriage having one lever arm thereof operatively connected with said reciprocable forking means, and means for operatively transmitting power from said generator to the other lever arm of said bell-crank means.

6. In an apparatus of the kind described, a wheeled carriage, an upright guide frame supported by said carriage, a forking means reciprocable in said guide frame, said forking means having downwardly directed tubular fork tines at its lower free ends, a power generator on said carriage, an oscillatable bell-crank means mounted on said carriage having one lever arm thereof operatively connected with said reciprocable forking means, means for operatively transmitting power from said generator to the other lever arm of said bell-crank means, a chain and sprocket drive means to transmit locomotive power to wheels of said carriage, a ratchet wheel for actuating said drive means, a pawl carried by a lever arm of said bell-crank means cooperative with said ratchet wheel, and means for timing the operative engagement of said pawl with said ratchet wheel relative to the operation of said forking means.

7. In an apparatus of the kind described, a wheeled carriage, an upright guide frame supported by said carriage so as to overhang an end thereof, a forking means reciprocable in said guide frame, said forking means having downwardly directed tubular tines at its lower free end, stationary ejector rods carried by said guide frame with which said tines are in telescopic slidable relation, a power generator on said carriage, an oscillatable bell-crank means mounted on said carriage having one lever arm thereof operatively connected with said reciprocable forking means, and means for operatively transmitting power from said generator to the other lever arm of said bell-crank means.

8. In an apparatus of the kind described, a wheeled carriage, an upright guide frame supported by said carriage so as to overhang an end thereof, a forking means reciprocable in said guide frame, said forking means having downwardly directed tubular tines at its lower free end, stationary ejector rods carried by said guide frame with which said tines are in telescopic slidable relation, a power generator on said carriage, an oscillatable bell-crank means mounted on said carriage having one lever arm thereof operatively connected with said reciprocable forking means, means for operatively transmitting power from said generator to the other lever arm of said bell-crank means, and carriage locomotion means operated from said power generator in timed relation to the operation of said forking means.

9. In an apparatus of the kind described, a wheeled carriage, an upright guide frame supported by said carriage so as to overhang an end thereof, a forking means reciprocable in said guide frame, said forking means having downwardly directed tubular tines at its lower free end, stationary ejector rods carried by said guide frame with which said tines are in telescopic slidable relation, a power generator on said carriage, an oscillatable bell-crank means mounted on said carriage having one lever arm thereof operatively connected with said reciprocable forking means, means for operatively transmitting power from said generator to the other lever arm of said bell-crank means, a chain and sprocket drive means to transmit locomotive power to wheels of said carriage, a ratchet wheel for actuating said drive means, a pawl carried by a lever arm of said bell-crank means cooperative with said ratchet wheel, and means for timing the operative engagement of said pawl with said ratchet wheel relative to the operation of said forking means.

BERNHARD NOLTE.